Patented Feb. 17, 1942

2,273,517

UNITED STATES PATENT OFFICE

2,273,517

AZO DYESTUFFS SOLUBLE IN WATER

Erich Fischer, Bad Soden in Taunus, and Hans Henke, Frankfort-on-the-Main, Germany, assignors to General Aniline & Film Corporation, New York, N. Y., a corporation of Delaware No Drawing. Application October 15, 1940, Serial No. 361,253. In Germany December 7, 1938

6 Claims. (Cl. 260—162)

The present invention relates to azo-dyestuffs soluble in water; more particularly it relates to the dyestuffs corresponding with the following general formula:

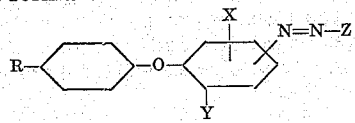

wherein the azo-group stands in ortho- or para-position to the oxygen bridge, X standing in meta-position to the azo-group means hydrogen or a non salt-forming group, Y stands for hydrogen, R for a butyl, hexyl, cyclohexyl or isooctyl radical and Z for the radical of a 1-sulfophenyl-5-pyrazolone or a 1-acylamino-8-hydroxynaphthalene-disulfonic acid.

We have found that valuable azo-dyestuffs are obtained by diazotizing an aminodiphenyl ether of the general formula:

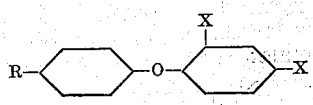

wherein R stands for a butyl, hexyl, cyclohexyl or isooctyl radical, and one X for the amino-group and the other X for hydrogen or a non salt-forming group, and coupling the diazo-compound obtained with a 1-sulfophenyl-5-pyrazolone or a 1-acylamino-8-hydroxynaphthalene-disulfonic acid. The dyestuffs obtained dye animal fibers yellow and red tints of good properties of fastness, especially of very good fastness to washing and to fulling. In comparison with the known dyestuff obtainable by coupling diazotized 1-amino-2-(4'-methylphenoxy)-benzene with 1-(4'-sulfophenyl)-5-pyrazolone-3-carboxylic acid, the dyestuffs obtained by the present invention are distinguished by their increased capability of being absorbed from a neutral bath as well as by their better fastness to sea-water. As to their fastness to washing, to fulling, to perspiration and to sea-water, the new dyestuffs are, furthermore, superior to the dyestuff obtainable by coupling diazotized 1-amino-3-cyclohexyl-6-phenoxy benzene with 1-(2'-chlorophenoxyacetylamino)-8-hydroxynaphthalene-4.6-disulfonic acid.

The aminodiphenyl ethers used as diazo-components in the process according to the present invention may be prepared by condensing a phenol of the general formula

wherein R has the meaning indicated above, for instance, with a nitrohalogenbenzene containing an exchangeable halogen atom, or with an ortho-dinitrobenzene and reducing in the usual manner the nitrodiphenyl ether so obtained.

The following examples serve to illustrate the invention, but they are not intended to limit it thereto; the parts are by weight:

(1) 269 parts of 2-amino-4'-hexyldiphenyl ether are diazotized and coupled with 254 parts of 1-(4'-sulfophenyl)-3-methyl-5-pyrazolone in the presence of sodium acetate. The dyestuff is worked up in the usual manner; it is a water-soluble yellow powder which dyes wool in a neutral bath yellow tints of very good fastness to washing, to fulling and to light.

The dyestuff corresponds with the following formula:

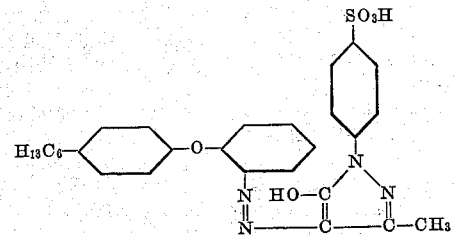

If the pyrazolone used in the above example is replaced by 288.5 parts of 1-(2'-chloro-5'-sulfophenyl)-3-methyl-5-pyrazolone or 312 parts of 1-(2'-sulfophenyl)-5-pyrazolone-3-carboxylic acid ethyl ester, dyestuffs of similar properties are obtained.

(2) A diazo-solution prepared from 297 parts of 2-amino-4'-isooctyl-diphenyl ether is combined with an aqueous solution of 288.5 parts of 1-(2'-chloro-5'-sulfophenyl)-3-methyl-5-pyrazolone in the presence of sodium acetate. When the coupling is complete, the dyestuff is filtered with suction and dried. It is a water-soluble yellow powder which dyes wool yellow tints of very good fastness to washing, to fulling and to light.

Dyestuffs of similar properties are obtained by exchanging the diazo-compound used in the preceding example for 303.5 parts of 2-chloro-4-amino-4'-hexyldiphenyl ether, 283 parts of 4-methyl-2-amino-4'-hexyldiphenyl ether or 356 parts of 4-carbethoxy-2-amino-4'-hexyldiphenyl ether.

(3) 521.5 parts of 1-(para-chloroxylenesulfamino)-8-hydroxynaphthalene-3.6-disulfonic acid in the form of its di-sodium salt are dissolved in water. After adding sodium acetate in excess a diazo-solution prepared from 331.5 parts of 4- chloro-2-amino-4'-isooctyl-diphenyl ether is run into the solution. The coupling is rapidly completed. The dyestuff which has been separated in the usual manner is a red powder which dyes wool red tints of very good fastness to washing and to fulling.

Dyestuffs of similar properties are obtained by replacing the diazo-component used in the preceding example by 241 parts of 2-amino-4'-tertiary butyldiphenyl ether or 267 parts of 2-amino-4'-cyclohexyldiphenyl ether.

(4) 269 parts of 2-amino-4'-hexyldiphenyl ether are diazotized and coupled with 473 parts of 1-(para-toluene-sulfamino)-8-hydroxynaphthalene-3.6-disulfonic acid in the presence of sodium acetate. The dyestuff which has been separated in the usual manner is a water-soluble red powder which dyes wool red tints of very good fastness to washing and to fulling.

When the toluenesulfamino-hydroxynaphthalene-disulfonic acid used is exchanged for 423 parts of 1-benzoylamino-8-hydroxynaphthalene-4.6-disulfonic acid or 377 parts of 1-carbethoxy-amino - 8 - hydroxynaphthalene - 3.6 - disulfonic acid, dyestuffs of similar properties are obtained.

(5) A diazo-solution prepared from 297 parts of 2-amino-4'-isooctyldiphenyl ether is added, while rapidly stirring, to an aqueous solution of the di-sodium salt of 423 parts of 1-benzoyl-amino-8-hydroxynaphthalene-3.6-disulfonic acid in the presence of sodium acetate. When the coupling is complete, the dyestuff which has been separated is filtered with suction and dried. It is a water-soluble dark red powder which dyes wool bluish-red tints of very good fastness to washing and to fulling.

If in the foregoing example the 1-benzoyl-amino-8-hydroxynaphthalene-3.6-disulfonic acid is replaced by 473 parts of 1-(para-toluenesulfamino) - 8 - hydroxynaphthalene-3.6-disulfonic acid, a dyestuff of similar properties is obtained.

We claim:

1. The water-soluble azo-dyestuffs of the following general formula:

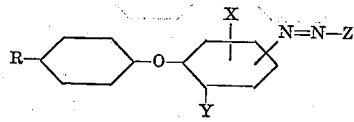

wherein the azo-group stands in one of the positions ortho- and para- to the oxygen bridge, X standing in meta-position to the azo-group means a member of the group consisting of hydrogen, chlorine, methyl and carbethoxy, Y stands for hydrogen, R for a member of the group consisting of butyl, hexyl, cyclohexyl and isooctyl, and Z for a member of the group consisting of a 1-sulfophenyl-5-pyrazolone radical and a 1 - acylamino - 8 - hydroxynaphthalene - disulfonic acid radical, being yellow and red powders which dye the animal fiber yellow and red shades of good fastness properties, especially of very good fastness to wet-processing and to light.

2. The water-soluble azo-dyestuffs of the following general formula:

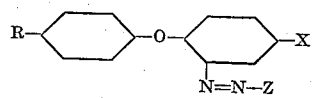

wherein X means a member of the group consisting of hydrogen, chlorine, methyl and carbethoxy, R stands for a member of the group consisting of butyl, hexyl, cyclohexyl and isooctyl, and Z for a member of the group consisting of a 1-sulfophenyl-5-pyrazolone radical and a 1-acylamino-8-hydroxynaphthalene-disulfonic acid radical, being yellow and red powders which dye the animal fiber yellow and red shades of good fastness properties, especially of very good fastness to wet-processing and to light.

3. The water-soluble azo-dyestuffs of the following general formula:

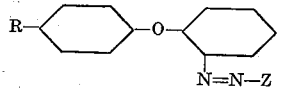

wherein R stands for a member of the group consisting of butyl, hexyl, cyclohexyl and isooctyl, and Z for a member of the group consisting of a 1-sulfophenyl-5-pyrazolone radical and a 1-acyl-amino - 8 - hydroxynaphthalene - disulfonic acid radical, being yellow and red powders which dye the animal fiber yellow and red shades of good fastness properties, especially of very good fastness to wet-processing and to light.

4. The water-soluble azo-dyestuff of the following formula:

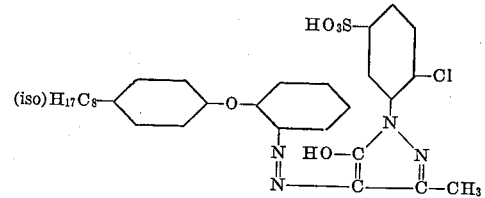

being a yellow powder which dyes the animal fiber yellow shades of good fastness properties, especially of very good fastness to wet-processing and to light.

5. The water-soluble azo-dyestuff of the following formula:

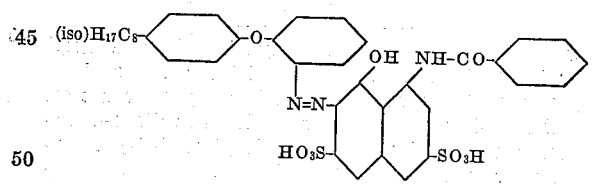

being a dark red powder which dyes the animal fiber bluish red shades of good fastness properties, especially of very good fastness to wet-processing and to light.

6. The water-soluble azo-dyestuff of the following formula:

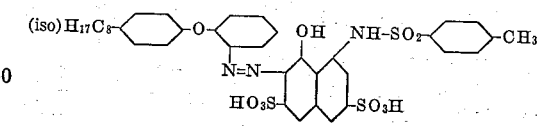

being a dark red powder which dyes the animal fiber bluish red shades of good fastness properties, especially of very good fastness to wet-processing and to light.

ERICH FISCHER.
HANS HENKE.